United States Patent [19]

Forwood et al.

[11] Patent Number: 5,106,637
[45] Date of Patent: Apr. 21, 1992

[54] LASER TREATMENT OF LIVESTOCK FEEDS

[75] Inventors: James R. Forwood, Rocheport, Mo.; Lloyd Davis, Los Alamos, N. Mex.

[73] Assignee: The United States of America as represented by the Secretary of Agriculture, Washington, D.C.

[21] Appl. No.: 551,100

[22] Filed: Jul. 6, 1990

[51] Int. Cl.$^5$ ................................................ A23K 1/00
[52] U.S. Cl. .................................... 426/237; 426/807; 426/635
[58] Field of Search ......................... 426/237, 635, 807

[56] References Cited

U.S. PATENT DOCUMENTS 4,358,467  11/1982  Patel ...................................... 426/237
4,839,181   6/1989  MacMurray et al. ............... 426/237

OTHER PUBLICATIONS

Warren G. Monson et al., "Effects of Length of Cut and Leaf Surface Treatment on Digestibility of Fresh Forage," Agron. J. 64: 405-406 (May-Jun. 1972).

Warren G. Monson et al., "Digestion of Fresh Forage in Rumen Fluid," Agron. J. 64: 231-233 (Mar.-Apr. 1972).

D. W. Beardsley, "Symposium on Forage Utilization: Nutritive Value of Forage as Affected by Physical Form. Part II. Beef Cattle and Sheep Studies," J. Animal Sci. 23: 239-245 (1964).

*Primary Examiner*—George Yeung
*Attorney, Agent, or Firm*—M. Howard Silverstein; Randall E. Deck; John D. Fado

[57] ABSTRACT

Forage crop plant materials are treated with a laser thereby puncturing the epicuticular wax layer of the plant leaves rendering the materials more accessible to microbes and/or enzymes. The products of this treatment are characterized by enhanced digestibility and therefore have utility as upgraded ruminant feed.

11 Claims, 2 Drawing Sheets

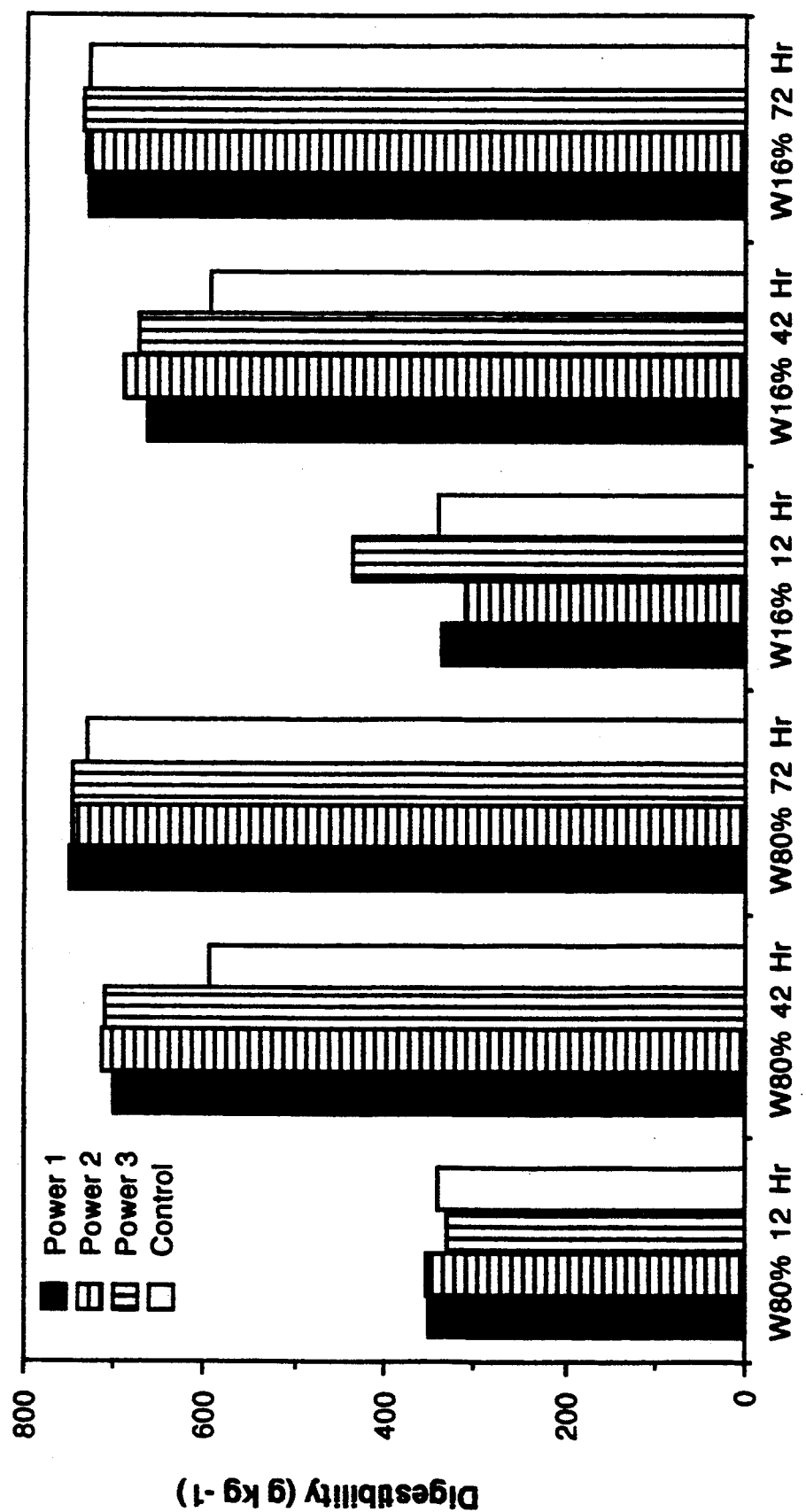
Fig 1. CO2 Laser- Whole Samples

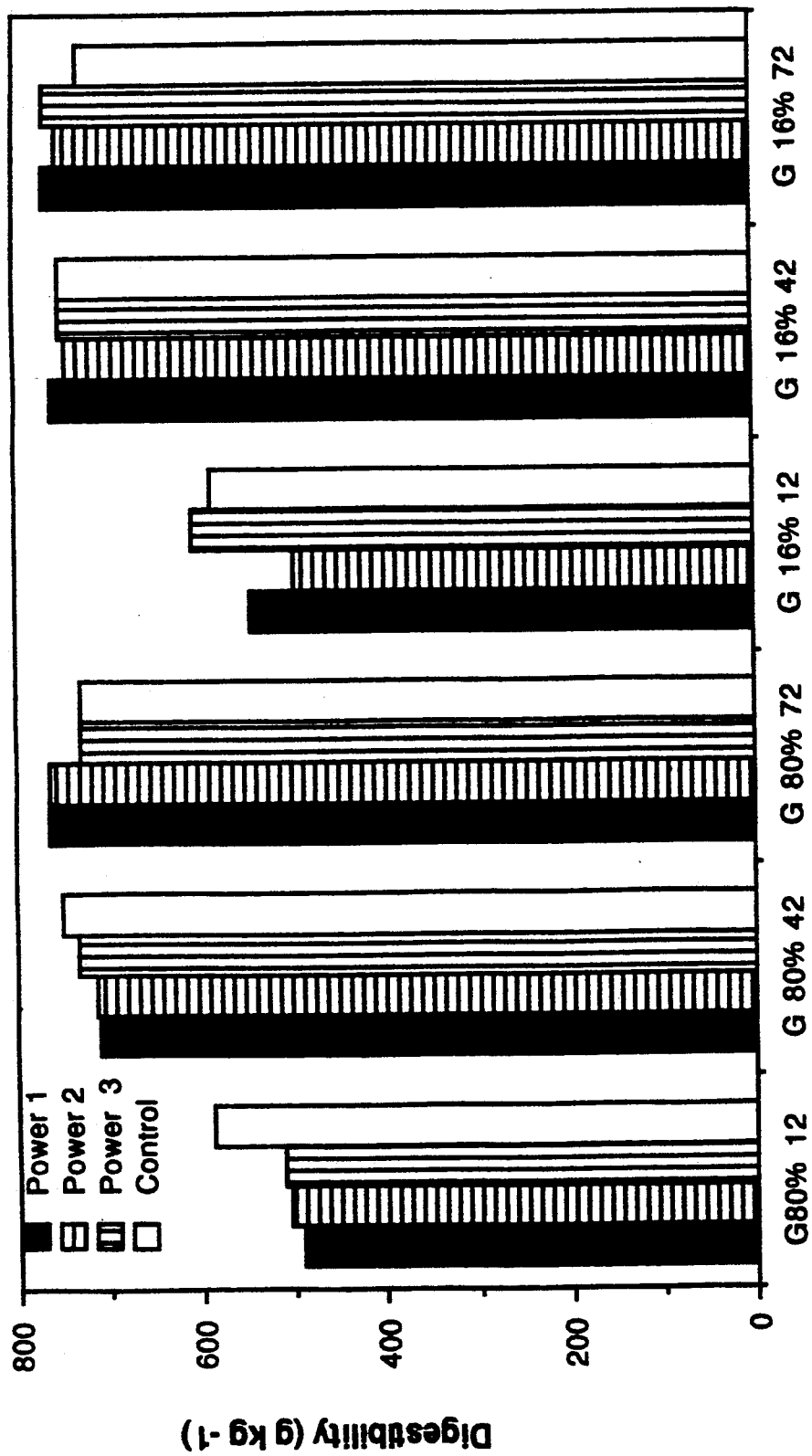

LASER TREATMENT OF LIVESTOCK FEEDS

BACKGROUND OF THE INVENTION

1. Field of the Invention

The epicuticular wax found on the epidermal surface of plant material impedes the penetration of rumen microbes into such materials. This results in slow digestion by ruminants and low rates of animal weight gain. This invention relates to a laser process for puncturing the epicuticular wax layer of nonwoody plant material and especially forage crop leaves, making forage crop substrates more accessible to microbes, for the purpose of enhancing the quality of forage as a feed for ruminants.

2. Description of the prior Art

Reducing the particle size of forage materials by cutting, crimping, or grinding is the standard method of increasing their utilization by ruminants. Studies on forage utilization by animals have revealed that the value of a forage to an animal can be significantly improved by grinding: feed intake may be increased as much as 25%; daily gain, 100%; and feed efficiency, 35% [Beardsley, J. Animal Sci. 23:239 (1964)].

Monson et al. 8 Agron. J. 64:405 (May–June 1972) and Agron J. 64:231 (March–April 1972)]studied the use of treatments of leaf surfaces in rupturing the cuticle to increase digestibility. The treatments employed involved mechanical abrasion of the leaf surfaces with sandpaper and puncturing the cuticle with a needle.

Further, small digestibility increases (about 3%) due to breeding efforts of grasses have been shown to provide a 25–35% increase in animal weight gain.

SUMMARY OF THE INVENTION

We have now discovered that lasers can be used to puncture the epicuticular wax layer of nonwoody plant material such as forage crop leaves with the result of enhancing digestibility of the material, thereby rendering it more available for assimilation by a forage-feeding animal. Quite unexpectedly, we have also found that this treatment not only punctures the epicuticular was layer to facilitate microbe entry, but also appears to chemically, photochemically, or by some unexpected physical phenomenon alter the plant material to even further increase digestibility.

In accordance with the process of the invention, the plant material to be treated is harvested and passed through the path of a laser of sufficient power and for a period of time effective to puncture the epicuticular wax layer of the plant material. The plant material may be subjected to optional preparatory steps before or after the laser treatment as described hereinbelow.

It is an object of the invention to provide a method for enhancing the digestibility of nonwoody plant material. In particular, it is an object to improve the digestibility, and thus efficiency of utilization, of forage material by livestock and ruminants.

It is a further object of the invention to provide a novel means for improving the rate of livestock weight gain.

Other objects and advantages of this invention will become readily apparent from the ensuing description.

BRIEF DESCRIPTION OF THE DRAWINGS

FIG. 1 shows the effects of laser treatment on whole leaf samples in Example 2.

FIG. 2 shows the effects of laser treatment on ground leaf samples in Example 2.

DETAILED DESCRIPTION OF THE INVENTION

According to the process of the invention, the plant material to be treated is harvested and optionally subjected to one or more preparatory steps. Such steps may include but are not limited to drying, or cutting, or chopping, or grinding to facilitate handling. Conversely, fresh plant material may be treated directly in its field harvested state. The plant material is then passed through the path of a laser of sufficient power and for a period of time effective to puncture the epicuticular wax layer o the plant material. The thus-treated plant material may be fed to the animals "as is" or-it may be subsequently subjected to one or more further preparatory steps which may be the same as or different from those described above.

Virtually any nonwoody plant material can be advantageously treated by the process of the invention. In particular, forage crops may be treated and include, without limitation thereto, hay, tall fescue (*Festuca arundinacea* Shreb.), and switch grass (*Panicum virgatum* L.).

The laser employed, its source, wavelength, power density or pulse energy, degree of focus and duration may be varied and may be readily determined by one skilled in the art. In particular, carbon dioxide ($CO_2$), argon (Ar), or nitrogen (N) lasers having a focused beam, unfocused beam, or scattered focused beam, or which are pulsed may be used. However, one skilled in the art will appreciate that other lasers may be used. further, the focus of the lasers can be varied through a continuum to meet different requirements.

The degree of improvement of forage quality attainable by the process of the invention for a given substrate is at least in part a function of the number of laser punctures in a given area of substrate surface. The minimum puncture density needed to achieve maximum forage improvement can be readily determined by the skilled artisan.

As compared to the original substrate, laser-treated forage exhibits a significant increase in vitro digestibility, and these products are ready for use as animal feed without further processing.

The following examples are intended only to further illustrate the invention and are not intended to limit the scope of the invention which is defined by the claims.

EXAMPLE 1

Leaf samples of tall fescue (*Festuca arundinacea* Shreb.) and switchgrass (*Panicum virgatum* L.) were harvested at late vegetative stage from plots located at the Agronomy Research Farm, University Missouri, Columbia, Mo. Leaves of both species were harvested, cut in 1.3×7.6 cm segments, air dried, pressed, and placed in sealed plastic bags. Two days later, fresh leaves of both species from the same plots were placed in sealed plastic bags and placed on ice in an insulated container. Dry and fresh samples were transported on ice to the University of Tennessee Space Institute near Tullahoms, Tenn., for treatment.

Treatment was performed with an Argon-ion laser (Model 135, Spectra Physics, Mountain View, Calif.) giving a well-collimated (focused) beam at a wavelength of 514 nm. An optical beam chopper, consisting of a rotating slotted disk was used to give a fixed exposure time of 1.0 sec with the sample being moved while the laser was blocked. The timing pulse from the beam chopper was implemented to trigger a motorized translation stage which was programmed to move the mounted samples to give the desired number of hits or holes per unit area. Control samples were removed from their packages for the same length of time as treated samples.

The laser power was 0.94 watt (2000 watts/cm$^2$; total energy of about 1 joule in the 1-sec exposure). Treatments consisted of 0, 10, and 30 laser holes per leaf segment (0, 1, and 3 holes/cm$^2$, respectively).

In vitro dry matter digestibility (IVDMD) of the treated samples was estimated by the modified procedure of Marten et al. [Prediction of Energy Digestibility of Forge With In Vitro Rumen Fermentation and Fungal Enzyme Systems, In: W. J. Pigden et al. (ed.), Standardization of Analytical Methodology for Feeds, Int. Dev. Res. Ctr., Ottawa, Canada (1980)]. Five leaf segments (totaling about 0.25 g) were placed in each in vitro tube with three replications of each.

Overall least square mean results of 144 observations covering the two species; dry and fresh samples; digestion times of 12, 24, 36, and 72 hrs; and three replicates, were as follows:

| Holes per cm$^2$ | IVDMD (%) | Standard error |
| --- | --- | --- |
| 0 | 25.0112500 | 0.4188453 |
| 1 | 27.6831250 | 0.4155602 |
| 3 | 28.6541667 | 0.4188453 |

EXAMPLE 2

Vegetative stage leaf samples of elephant grass (*Pennisetum purpureum* Schum.) were harvested from an area near Ona, Fla. Leaf material was cut into 1.3×7.6 cm segments, air dried while being pressed and placed flat in manila envelopes for storage and transportation.

Leaves were treated as whole or ground samples. Whole samples were actually 3-in segments which were treated with the laser and placed into the in vitro tubes in that form. Ground samples were treated as 3-in segments but were then ground through a Udy mill (1.0 mm screen). This was done to determine if the effects of the laser treatment could still be seen even after reduction to a very small particle size, much smaller than that commonly found in the rumen. The hypothesis is that if laser effects could still be seen after grinding, which allows practically unlimited microbial access to the substrate, the possibility exists that some unexpected chemical or photochemical phenomena is taking place as a result of the laser treatment which results in improved digestibility.

Treatment of the leaves was performed with a United Technologies (Hartford, Conn.) 25 kw CO$_2$ laser operating at 1.0 kw of power (100,600 nm). Leaf samples were exposed to a range of laser power from 0–4.8 J/cm$^2$. In this example four levels of laser radiation were used (0, 3.4, 4.0, and 4.8 J/cm$^2$). This was accomplished by mounting the samples on an aluminum arm which passed under a 1.25 cm$^2$ laser at speeds of 14,000, 12,000, and 10,000 cm min$^{-1}$, respectively. The aluminum arm was rotated with a variable speed electric motor which was computer controlled.

Leaf segments were randomly assigned to control (C), laser power 1 (P1), power 2 (P2), or power 3 (P3) (0, 3.4, 4.0, or 4.8 J/cm$^2$, respectively) treatments. Each treatment was composed of two subtreatments where either 80% or 16% of the leaf surface area was exposed to the laser. This was accomplished by making five passes (80%) or one pass (16%) of the samples under the laser. A computerized stage moved the samples incrementally in order to avoid overlapping laser exposure. Leaf segments were then evenly divided into samples to be analyzed as whole segments or ground segments. While whole segments were placed whole into in vitro incubation tubes, ground segments were processed through a cyclone grinder having a 1.0 mm screen before being placed into the in vitro tubes.

Effects of the laser were evaluated by IVDMD. Sub-subsamples were allotted to in vitro tubes incubated for 12, 42, and 72 hrs in order to determine rates of digestion. The results are shown in FIGS. 1 and 2.

The most effective treatment of whole samples was found with power level two (the moderate power level) and was seen after 42 hrs of digestion (FIG. 1). The advantage over the control was 12% and 10% digestibility for the high level of treatment (about 80% of the leaf area treated) and low level of treatment (about 16% of the leaf area treated), respectively. When only 16% of the leaf area was treated, an advantage of 9.4% was seen after 12 hrs of digestion when laser power three (the least of the laser power levels) was applied. The 42-hr time period and the 12-hr time period are most desirable for positive results as rapid passage through the digestive tract allows the ruminant to ingest more herbage and gain weight more rapidly.

Usually, as was seen with the whole material, by 72 hrs most of the digestible material has been digested and the treatments and controls even out in digestibility. However, the ground material shows that when the herbage was treated over 80% of its area, laser power one and power two showed a 3.4% increase i digestibility over the control (FIG. 2). The same effect was seen when 16% of the leaf area was treated at powers one and three where the laser increased digestibility by 3.9% over the control. These data were very unexpected. Because most of the digestible material should be gone by 72 hrs, it is believed that the laser has physically or photochemically altered the herbage in some way such that it can be digested further than it would be ordinarily. That suggests that previously indigestible material has now become digestible. Since the herbage has already been reduced in particle size and microbes have had ample physical access (grinding) and time (72 hrs) to attack the material, the increased digestibility could be due to some laser induced photochemical change.

It is understood that the foregoing detailed description is given merely by way of illustration and that modification and variations may be made therein without departing from the spirit and scope of the invention.

We claim:

1. A method for treating a nonwoody plant material comprising puncturing the epicuticular wax layer of plant material by means of a laser to an extent effective for enhancing digestion of the material, thereby rendering the material more available for assimilation upon ingestion by an animal.

2. The method of claim 1 wherein said plant material is a forage crop.

3. The method of claim 2 wherein said forage crop is tall fescue.

4. The method of claim 2 wherein said forage crop is switchgrass.

5. The method of claim 1 wherein said laser is selected from the group consisting of Ar, $CO_2$, and N lasers.

6. The method of claim 1 wherein said extent of puncturing is at a rate in the range of about 1–3 holes per square centimeter.

7. A product produced by the method of claim 1.
8. A product produced by the method of claim 2.
9. A product produced by the method of claim 3.
10. A product produced by the method of claim 4.
11. A product produced by the method of claim 5.

* * * * *

UNITED STATES PATENT AND TRADEMARK OFFICE
CERTIFICATE OF CORRECTION

PATENT NO. : 5,106,637
DATED : April 21, 1992
INVENTOR(S) : James R. Forwood and Lloyd Davis It is certified that error appears in the above-identified patent and that said Letters Patent is hereby corrected as shown below:

```
Column 1, line 25, delete "8" and insert -- [ -- ;
Column 1, line 43, delete "was" and insert -- wax -- .
Column 2, line 15, delete "o" and insert -- of -- ;
Column 2, line 44, delete "in vitro" and insert -- in in vitro -- ;
Column 2, line 63, delete "Tullahoms" and insert -- Tullahoma -- .
Column 3, line 16, delete "Forge" and insert -- Forage -- .
Column 4, line 37, delete "i" and insert -- in -- .
```

Signed and Sealed this

Thirteenth Day of July, 1993

Attest:

MICHAEL K. KIRK

*Attesting Officer*     *Acting Commissioner of Patents and Trademarks*